(12) United States Patent
McLaughlin et al.

(10) Patent No.: US 11,044,320 B2
(45) Date of Patent: Jun. 22, 2021

(54) DATA DISTRIBUTION METHOD FOR A PROCESS AUTOMATION AND INTERNET OF THINGS SYSTEM

(71) Applicant: Honeywell International, Morris Plains, NJ (US)

(72) Inventors: Paul McLaughlin, Ambler, PA (US); Joseph Pradeep Felix, Coopersburg, PA (US); Christopher Michael Gilbert, Wavell Heights (AU); David Barry Granatelli, Lilyfield (AU); James A. Strilich, Phoenix, AZ (US)

(73) Assignee: Honeywell International Inc., Charlotte, NC (US)

( * ) Notice: Subject to any disclaimer, the term of this patent is extended or adjusted under 35 U.S.C. 154(b) by 150 days.

(21) Appl. No.: 16/372,025

(22) Filed: Apr. 1, 2019

(65) Prior Publication Data
US 2020/0314183 A1    Oct. 1, 2020

(51) Int. Cl.
*H04L 29/08* (2006.01)
*H04L 9/06* (2006.01)
*H04L 29/06* (2006.01)

(52) U.S. Cl.
CPC .......... *H04L 67/125* (2013.01); *H04L 9/0643* (2013.01); *H04L 63/0236* (2013.01); *H04L 65/4076* (2013.01); *H04L 67/2847* (2013.01); *H04L 67/36* (2013.01)

(58) Field of Classification Search
CPC . H04L 67/125; H04L 9/0643; H04L 63/0236; H04L 65/4076; H04L 67/2847; H04L 67/36; G05B 2219/31094; G05B 19/4183
See application file for complete search history.

(56) References Cited

U.S. PATENT DOCUMENTS

| | | | | |
|---|---|---|---|---|
| 5,988,847 A | * | 11/1999 | McLaughlin | G05B 19/4185 700/9 |
| 6,272,386 B1 | * | 8/2001 | McLaughlin | G05B 19/058 700/82 |
| 6,421,570 B1 | * | 7/2002 | McLaughlin | G05B 19/4185 700/2 |
| 7,376,712 B1 | * | 5/2008 | Granatelli | H04L 67/12 709/219 |
| 2009/0109889 A1 | * | 4/2009 | Budampati | H04L 12/1895 370/312 |
| 2013/0290729 A1 | * | 10/2013 | Pettigrew | G06F 21/51 713/187 |
| 2016/0210260 A1 | * | 7/2016 | Case | G06F 13/4068 |

* cited by examiner

*Primary Examiner* — Shean Tokuta
*Assistant Examiner* — Juan C Turriate Gastulo
(74) *Attorney, Agent, or Firm* — Paschall & Associates, LLC; Anthony Miologos

(57) ABSTRACT

A distribution system that provides for multicast transmission of the most important data that is of highest interest and value to client applications including HMI stations, historians, trend views, alarm management functions, advanced process controls, peer-peer communications and supervisory control. A blast list containing the types of data that are to be collected is formulated and stored in a system server and sent to embedded controllers which then multicasts that data to the system server and all console stations in the system.

20 Claims, 4 Drawing Sheets

DATA DISTRIBUTION METHOD FOR A PROCESS AUTOMATION AND INTERNET OF THINGS SYSTEM

Many process facilities (e.g., a manufacturing plant, a mineral or crude oil refinery, etc.) are managed using distributed control systems. Typical contemporary control systems include numerous modules tailored to monitor and/or control various processes of the facility. Conventional means link these modules together to produce the distributed nature of the control system. This affords increased performance and a capability to expand or reduce the control system to satisfy changing facility needs.

Process facility management providers, such as Honeywell, Inc., develop control systems that can be tailored to satisfy wide ranges of process requirements (e.g., global, local or otherwise) and facility types (e.g., manufacturing, warehousing, refining, etc.). Such providers have two principle objectives. The first objective is to coordinate control of as many processes as possible to improve an overall efficiency of the facility. The second objective is to support a common interface that communicates data among various modules controlling or monitoring the processes, and also with any modules supervising the process or displaying process data in an operator center.

Each process, or group of associated processes, has one or more input characteristics (e.g., flow, feed, power, etc.) and one or more output characteristics (e.g., temperature, pressure, etc.) associated with it.

The distributed control systems used to monitor and control a process are frequently linked by common communication pathways, such as by a local area network (LAN) architecture or by a wide area network (WAN) architecture. When a requesting node needs a datum from a responding node, it issues a request for the datum across the network and the responding node then returns the datum back across the network. Many process control systems use a supervisory control LAN or WAN integrated with one or more process control networks. The process control networks contain the basic raw data required by the supervisory control network and other process control networks.

Typically, a supervisory controller is linked to a flexible array of processor controllers using communication drivers matched to the specific processor controller being interfaced. The supervisory controller maps the essential data of these process controllers into a homogeneous database controlled by the supervisory controller for consistent storage and access by individual process controller or by any client application being executed by the supervisory controller.

Generally, a supervisory control network joins process control network(s) by polling (scanning) at a fixed or flexible interval for all data that is mapped by user configuration to the supervisory control systems database. One or more server nodes and one or more console station nodes physically join the supervisory control local and wide area networks to the process control network(s). These server nodes are the primary data repositories for all client access among the supervisory client nodes. The console station nodes are the primary data repositories for operational display access, thereby allowing operators to perform their critical supervisory role.

A DCS is a system of sensors, controllers, and associated computers that are distributed throughout a plant. Each of these elements serves a unique purpose such as data acquisition, process control, as well as data storage and graphical display. These individual elements communicate with each other through the plant's local area network—often referred to as a control network. As the 'brain' of the plant, the DCS makes automated decisions based on production trends it sees in real-time throughout a plant. An embedded controller is a specialized processor/computer with all the hardware and software to do a specific automation task, such as running a plant/factory.

Conventional distributed control systems (DCS) use methods such as publish/subscribe and request/response to move data from embedded controllers to clients and applications at the supervisory level. These approaches generally work well enough but are constrained by the limited resources available in these embedded devices. In addition, each client running on a separate computer node consumes additional resources from the controllers. Consequently, the controllers are only able to publish a small fraction of the available parameter data and often data collection schemes must be carefully constructed to balance the needs of interactive human operators, process engineers, historical data collection and application needs.

This invention proposes adding a third data access mechanism based on broadcasting a significant percentage of the high value parameter data. The engineer has a variety of methods to quickly establish a list of high value parameters and then the embedded controller will efficiently multicast this list of parameter data every second (or faster). It can then be received by numerous clients on a multitude of computer nodes without any additional burden on the controller.

SUMMARY OF THE INVENTION

The invention provides a system for moving data from a group of embedded controllers to supervisory level clients, displays and applications. The system comprises a system server connected to a group of embedded controllers. The system server contains a blast list definition of parameters to be communicated to the group of embedded controllers. The group of embedded controllers comprises an execution environment, the blast list and a blast hub having multicasting communication capabilities to multicast data meeting the blast list definition of parameters to the system server and to at least one console station; and at least one console station comprising a blast CDA server to receive the data meeting the blast list definition of parameters and a blast service to store said data meeting the blast list definition of parameters to a dynamic cache where it may then be retrieved and shown on an operational display. The parameters in the blast list are selected from one or more recommended parameters contained in programmable elements within at least one of the controllers; are identified by a set of parameters contained in a fast history subsystem or the parameters in the blast list are additional parameters that are selected on an ad hoc basis. The system server contains a blast service to form the blast list and to pass the blast list to a blast CDA server where the blast list is scattered into individual blast lists for each controller and then these scattered blast lists are transmitted to said embedded controllers. The blast CDA server will then receive the multicast data meeting the blast list definition of parameters and then pass the data onto the blast service which will then store said data into a dynamic cache that is accessible by one or more process displays, a fast history collection and outside applications. The blast CDA server can handle communication with the embedded controllers, send parts of the blast list to each of said embedded controllers and receive and process multicast messages received from said embedded controllers. The multicast messages comprise handle packets describing a layout and meta data of the parameters being multicast and data packets containing a current parameter value and status for each parameter in the blast list. The handle packets are configured to be sent each time a new blast list is defined or a new client, being a system server or console station, is connected to said embedded controllers.

The invention also comprises a process of collecting data by defining a blast list comprising at least one parameter on a system server; sending the blast list from the system server to each controller in a group of controllers; collecting data comprising said at least one parameter on each controller; sending the data from each controller to the system server and each console station within a group of console stations by a multicast of data; the data on the system server is then made available to one or more clients outside of said system server. The blast list is first defined, then stored on the system server and made ready to be readily accessed by one or more components inside or outside of a system. The definition of the blast list may be stored in a database file on the system server. The blast list comprises all the parameters that are determined to be of highest importance to collect for analysis. Each of the controllers contain a blast list and a blast hub for transmitting data comprising said at least one parameter. There are one or more clients that are selected from the group consisting of one or more of display screens, outside computers or servers, applications to analyze said data and a history of said data collected over a defined period of time. Each of the controllers is divided into a communication module to handle incoming and outgoing network messages and one or more execution environments to execute function block logic. The execution environment as employed in the present invention comprises a blast hub and a blast list wherein a definition for the blast list is communicated from said system server and wherein upon receiving said blast list the blast hub multicasts a series of handle packets that describe the layout and meta data of the blast list for all clients comprising a system server and at least one console station. After the multicast of the series of handle packets is complete, the blast hub shifts to multicasting the values and status of the parameters in the blast list to all clients. Each time a new client is connected to said embedded controllers, the handle packets are resent by multicasting to all clients. The parameters in said blast list may be selected from one or more recommended parameters contained in programmable elements within at least one of the controllers. The blast list may be identified by a set of parameters to be collected by a fast history subsystem. A portion of the parameters in the blast list may be additional parameters that are selected on an ad hoc basis by the operator of the system server. An efficient process to protect the security of the system is by having the packets defining the blast list and the handle packets from the controllers to be cryptographically verified. The data packets from the controllers will use computationally simpler tamper detection schemes. A system of white listing the origin of all packets will be employed to ensure that the embedded controllers can trust the blast list definitions and so that the system server and all console stations can trust the handle and data packets multicast from the embedded controllers.

Key Terminology for the Invention

Blast list—a list of parameters that the embedded controllers will publish via multicast network packets and then received simultaneously by all listening client nodes.

Blast hub—a software component that executes in the embedded controllers and which progressively publishes the parameters in the blast list using multicast network packets at a defined regular interval of time.

Blast CDA server—software component that executes on each system server and console station node and which handles all transmission and reception of blast list related network packets to and from the embedded controllers Blast service—software component that executes on each system server and console station node and which performs the critical functions of blast list definition and storing all received parameter data into the dynamic cache.

Dynamic cache—existing software construct that shields the embedded controllers from the numerous consumers of parameter data from said embedded controllers.

Multicasting—an existing network technology that allows a single network packet to be sent out and received by multiple clients; while a powerful concept, it is traditionally not used because it does not guarantee delivery or even arrival of packets in the original sequence.

DETAILED DESCRIPTION OF THE INVENTION

Figure 1:
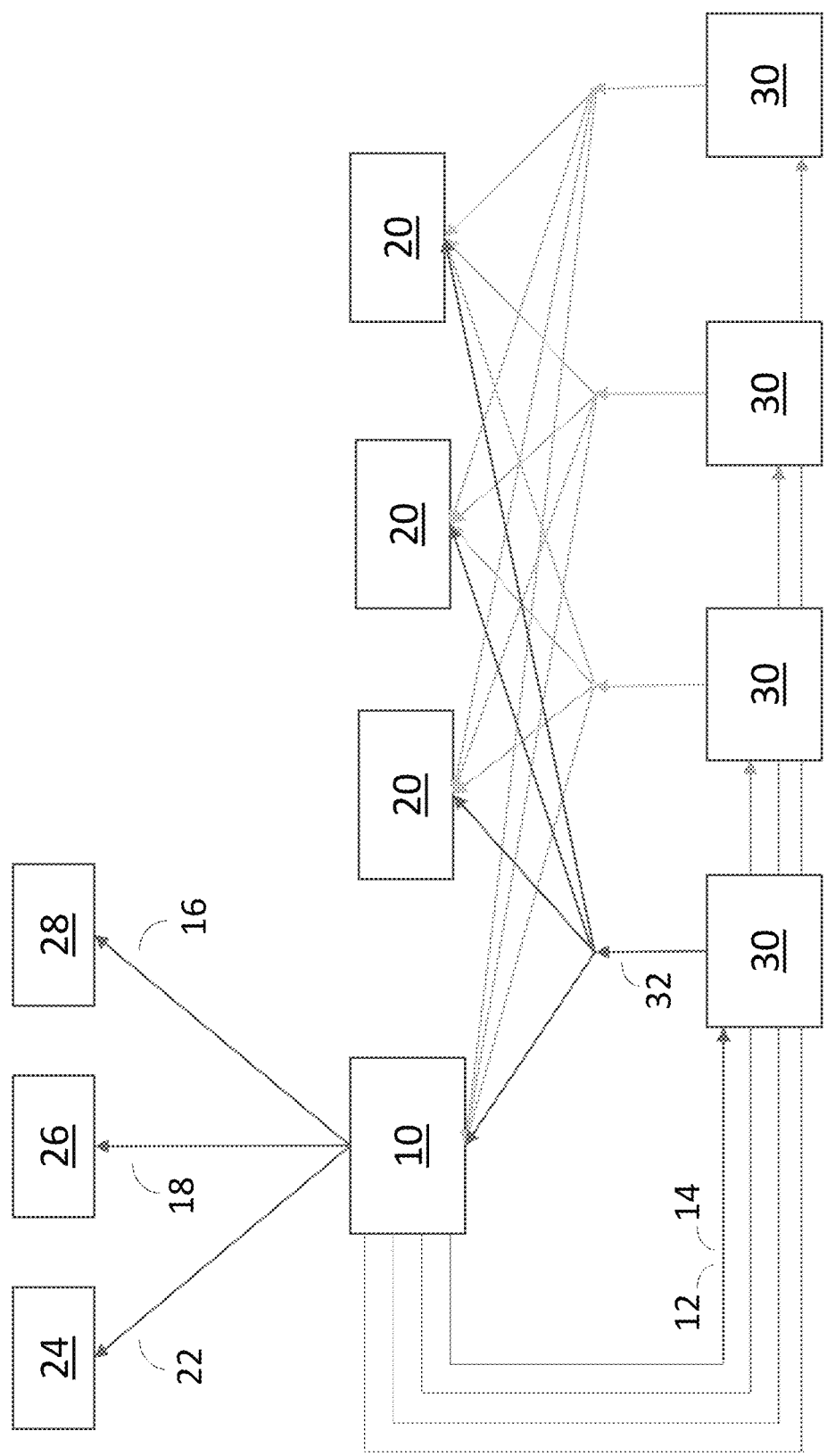
FIG. 1 shows an overview of the architecture of the distribution of data in the system of the invention.

An embedded controller is composed of software logically divided into a communication module plus one or more execution environments. The communication module handles all incoming and outgoing network messages while the execution environments are concerned with the execution of function block logic. The communication module is responsible for fetching the parameter data from the execution environments to satisfy all publish/subscribe and request/response traffic.

Embedded controllers monitor associated processes and operate to varying degrees in accordance with supervisory data to control the associated processes, and, more particularly, to modify one or more processes and improve the monitored characteristics and the facility as a whole. For example, an embedded controller may read physical parameter data from a process, such as temperature, pressure, flow rate, and the like, and use some or all of that process data and, perhaps, some supervisory data to control the process. This is particularly true in a feedback-controlled process.

In the simplest embodiments, an exemplary embedded controller may be a micro-controller circuit fabricated on a circuit board and integrated into one of the processes (i.e., part of a separator, washer, or grinder) that is being controlled. In other embodiments, an exemplary embedded controller may be a stand-alone device, that is remote from the controlled process and coupled to it by a bus architecture.

An exemplary embedded controller is physically constrained in terms of computing power and resources. It will typically be low power which helps it to operate in challenging thermal environments and it will have fixed memory and storage resources. An embedded controller is typically viewed as a fixed asset in the plant/factory and is expected to work without hardware upgrade for at least one or more decades.

Process data may be transferred directly between embedded controllers in a peer-to-peer relationship, as in a LAN network. For example, a process controller, which controls a washer, may request process data from three embedded controllers, which control three grinders, in order to determine the rate at which ground raw material is being output from the three grinders. The washer may thereby adjust the rate at which it washes the ground material. For example, the washer may reduce the amount of power that it uses to wash the ground raw material when the amount of ground raw material being sent to the washer is relatively low. It may even temporarily shut down in order to "hold and wait" for a suitable amount of ground raw material to accumulate before it resumes washing.

In some embodiments of the present invention, one or more client applications are executed on various nodes of the network architecture. The nodes may be, for example, personal computers (PCs) or other embedded controllers. The client applications may all require the same process data and supervisory data to be transferred at regular intervals from the process controllers. Alternately, the client applications may require different but over-lapping subsets of the process data and supervisory data to be transferred at regular intervals from the process controllers.

The existing system has a dynamic cache that shields the embedded controllers from the numerous individual requests of the various clients (both in system and external) that want to consume parameter data from said embedded controllers. In the existing system, the term "dynamic", when used to refer to the cache, refers to the ability of the cache to hold parameter data and/or supervisory data of current or recent interest to the client applications communicating with the domain of the controllers.

The present invention uses multicasting to efficiently communicate data from the embedded controllers to the console stations and system server. With regular transmission technologies like TCP, the embedded controllers would need to send each data packet multiple times; once to the system server and then again for each individual console station. With multicasting technology, the data packets are transmitted once by each embedded controller, but the system server and the console stations will all receive the same data packets. This invention reduces the communication workload and frees up resources in the embedded controllers. The data packets are then processed and ultimately stored in the dynamic cache on the system server and each console station whereby subsequent clients can then access the available data without having to make any explicit requests to the embedded controllers.

The data distribution invention augments the existing embedded controller architecture by adding a blast hub and blast list to each execution environment within said embedded controller. The definition of the blast list for each execution environment is supplied from the system server to the communication module which places it onto a shared queue for retrieval by the blast hub. Once the blast hub has its blast list, it will multicast out a series of handle packets that describe the layout and metadata of the blast list for all clients. The blast hub then shifts to rapidly multicasting the values and status of the parameters in the blast list within data packets. Anytime a new client connects, the blast hubs will resend the handle packets that contain the layout and metadata information.

Each controller can be packed with tens of thousands of parameters. It is not feasible for resource constrained embedded controllers to be able to publish the data for all these parameters every second. Instead there must be a way for an engineer to define the list of high value parameters that will be collected at this rapid rate.

The following list formation methods have been defined and they can be used individually or in combination at the engineer's discretion. Where the same parameter would be selected by more than one method, that parameter will still only appear once in the final blast list. Modern controllers implement control logic through programmable elements known as function blocks. The engineering tools allow the selection, layout and interconnections between these function blocks. Each function block defines several input, output and internal parameters. The designers of each type of function block can make a recommendation as to which parameters from each function block will most likely be of high value to customers.

In the first method, an engineer may choose to allow the data distribution blast list to be formed from the recommendations of the engineering tools and the function blocks.

Supervisory control systems currently allow the user to define the set of parameters to be collected by a fast history subsystem. Fast history subsystems are generally configured to collect the specified parameters every 1-5 seconds.

In the second method, an engineer may choose to have the data distribution blast list composed of parameters already configured to be collected by a fast history subsystem. Due to the increased efficiency of the data distribution mechanism, customer would likely configure more parameters to be collected via the fast history subsystem.

In the unlikely event that additional parameters are required to be collected via the efficient data distribution mechanism and are not already specified by either the first or the second method, then a third method allows for the specification of an ad hoc list of parameters.

Relevant aspects of security and reliability are handled between the blast CDA server and the embedded controllers.

The need to limit the computational workload of the embedded controllers means that cryptography is applied selectively and only where it is considered most important. The packets sent to the controllers that define the blast list are cryptographically verified as well as the handle packets published from the controllers via multicasting.

All clients validate that multicast packets are received from an expected 'white list' of controllers in the system. The multicast data packets use a light-weight hash for detection of tampering.

In FIG. 1 is shown an example of an overview of the data distribution of a system contemplated by the present invention. There is at least one system server 10 for managing the overall system. System server 10 is both in communication with other elements in the system by a conventional connection 12 as well as an additional communication 14 that is sending a definition of a blast list as defined in the present invention from system server 10 to embedded controllers 30. In a plant such as a refinery that contains the system of the present invention, there will typically be fifty to a hundred or more embedded controllers, but to illustrate the invention, a small group of embedded controllers 30 is shown in the Figures. Embedded controllers multicast data 32 defined by the parameters in the blast list to the system server 10 and a series of console stations 20 which may include a display for an operator to observe the data and make changes to the operation as needed to maintain the operations within specified parameters. Several streams of data are shown being communicated in data streams 16, 18 and 22 being sent to an analytics function 28, a historical collection of data over a period of time 26 and to other applications as shown at applications 24.

Figure 2:
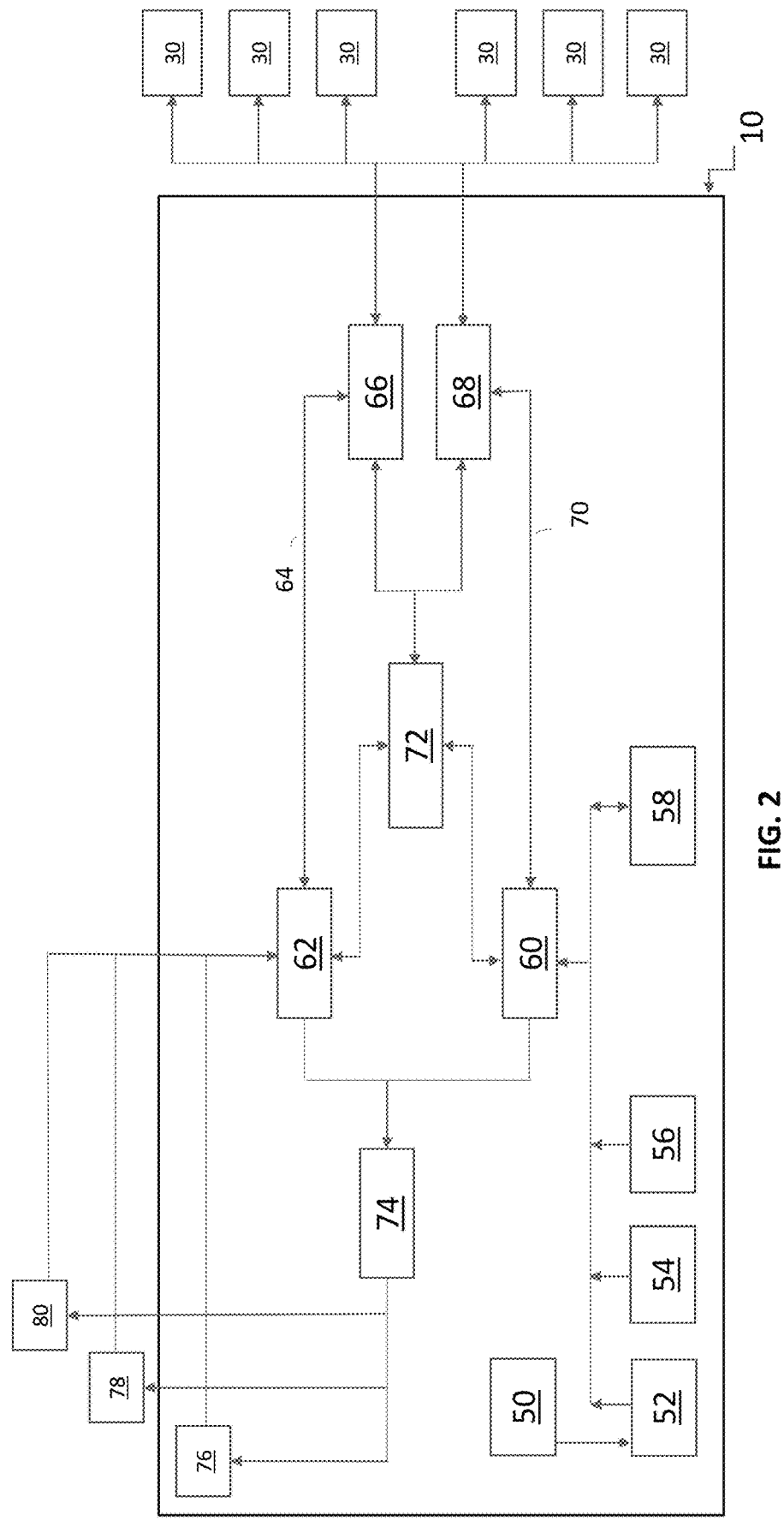
FIG. 2 is a flowchart of the data distribution from the viewpoint of the system server as well as the connection to outside clients and to the controllers.

In FIG. 2 is shown the data distribution architecture in relation to the system server and those software components that are necessary to explain the present invention. For comparison, elements in the current system that handle traditional communication 64 are shown as GDA manager 62 and CDA server 66. In the present invention, system server 10 has a block configuration 50 supplying block type information to a block list 52, adjunct list 54 and history list 56, that separately or in combination function to provide a list of parameters to blast list 58. The blast list 58 is communicated from blast service 60 to blast CDA server 68 which then scatters the blast list into individual blast lists for each controller 30. The individual controller blast lists are then transmitted by the blast CDA server 68 to the controllers 30. Controllers 30, having received their blast list of parameters, multicast the data from those parameters to blast CDA server 68 and then to be sent to blast service 60 and then stored within the dynamic cache 74 from which the data may be retrieved for fast history 76, displays 78 or applications 80. A system repository 72 also is shown in relation to GDA manager, blast service 60, CDA server 66 and blast CDA server 68. The system repository 72 translates the named representation of data parameters into compact numerical handle representations used by controllers 30. This translation is also performed in reverse.

Figure 3:
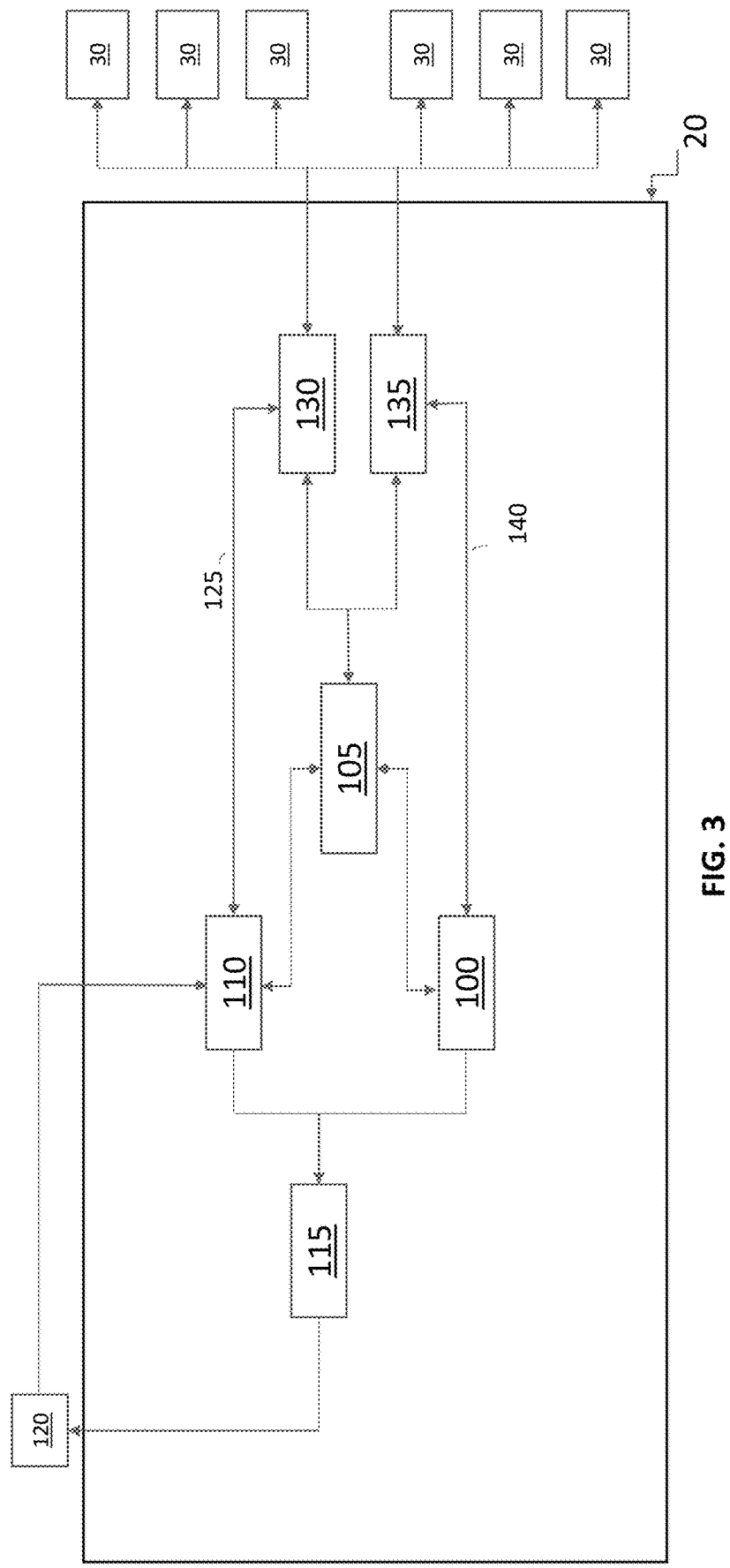
FIG. 3 shows the data distribution architecture with regards to a console station as communicating with a group of controllers.

In FIG. 3 is shown the data distribution architecture with regards to a console station 20. Data from controllers 30 is sent to both CDA server 130 and blast CDA server 135. As shown in FIGS. 1 and 2, data meeting the parameters defined by the blast list are multicast to blast CDA server 135 and then converted and sent to blast service 100 to be stored in dynamic cache 115 and displayable on displays 120. As in FIG. 2 the system repository 105 provides name to handle translation services and vice-versa. GDA manager 110 and CDA server 130 are shown to provide context of the current system using regular networking technology.

Figure 4:
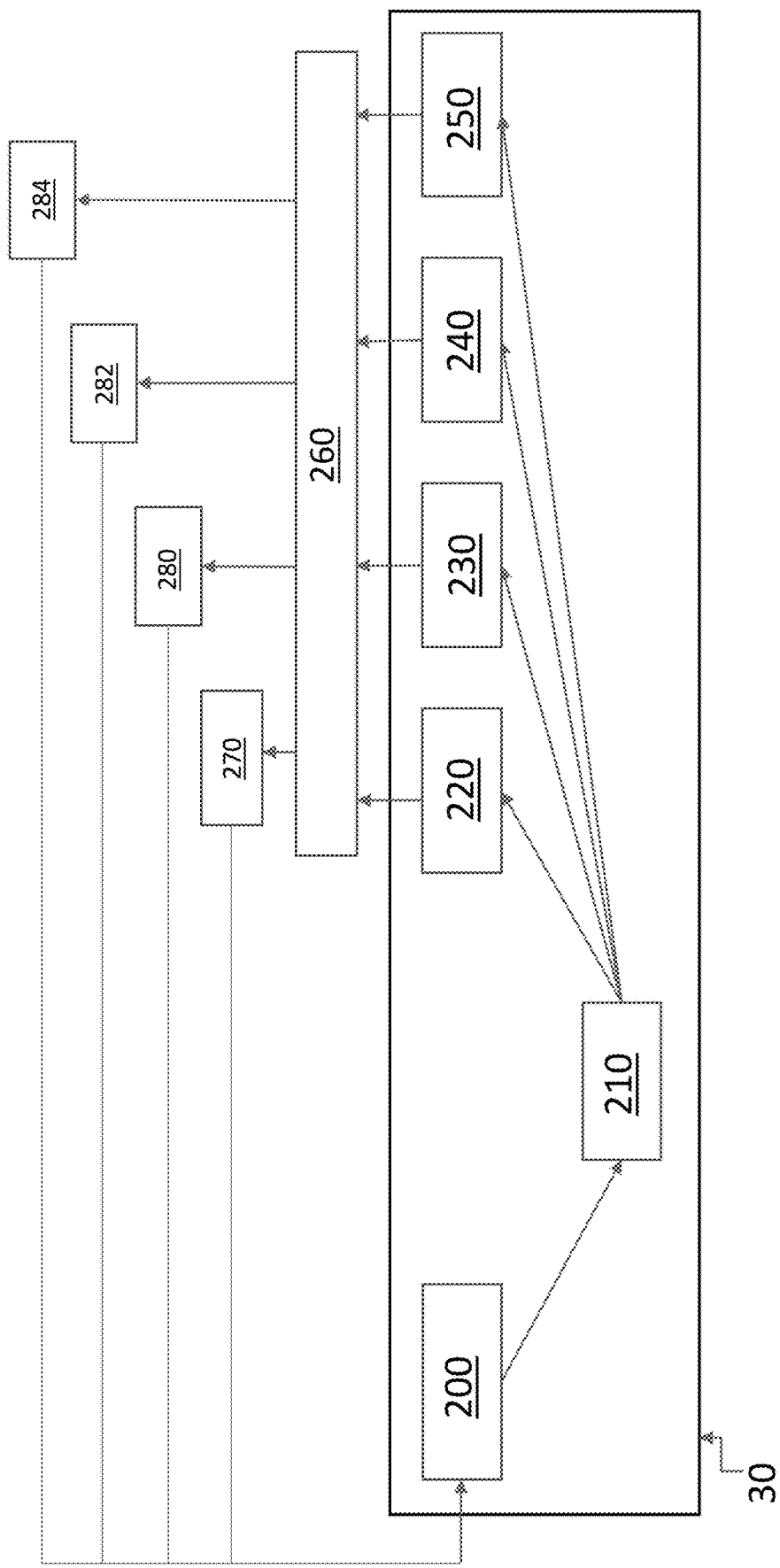
FIG. 4 shows the data distribution architecture with relation to embedded controllers as they communicate with the system server and console stations.

In FIG. 4 is shown an embedded controller 30 and its position and function in the system of the present invention. Embedded controller 30 is shown with CDA communication module 200 that receives instructions from system server 270 including the blast list definition and instructions on being connected to the components in the system. CDA communication module 200 is shown communicating to shared memory queues 210 and then to a series of four execution environments 220, 230, 240 and 250 each of which have their specific parts of the blast list defining the parameters that are being measured and multicast at 260 to system server 270 and console stations 280, 282 and 284. The number of console stations will vary as required by the particular plant and there may be additional system servers to communicate with different parts of a plant. Controller 30, as shown, includes a platform environment 220, control execution environment 230, and two 10 link environments 240 and 250.

The invention claimed is:

1. A system for moving data from a group of embedded controllers to supervisory level clients and applications, said system comprising,
  a. a system server connected to a group of embedded controllers, wherein said system server contains a blast list definition of parameters to be communicated to said group of embedded controllers;
  b. the group of embedded controllers comprising an execution environment, and a blast hub having multicasting communication capabilities to multicast data meeting said blast list definition of parameters to said system server and to at least one console station; and
  c. the system server and at least one console station comprising a blast Control Data Access (CDA) server receiving said data meeting, said blast list definition of parameters and a blast service to store said data meeting said blast list definition of parameters to a dynamic cache, said blast list communicated from said blast service to said blast CDA server which scatters said blast list into individual blast lists for each controller, where said data can be made available to displays, fast history subsystem or outside applications and analytics.

2. The system of claim 1 wherein the parameters in said blast list are selected from one or more recommended parameters contained in programmable elements within at least one of said controllers; are identified by a set of parameters contained in a fast history subsystem or the parameters in said blast list are additional parameters that are selected on an ad hoc basis.

3. The system of claim 1 wherein said system server contains the blast service to form the blast list and to pass the blast list to the blast CDA server and the dynamic cache to store parameter value and status data that is accessible by one or more process displays, a fast history collection and outside applications.

4. The system of claim 3 wherein said blast CDA server can handle communication with said embedded controllers, send parts of the blast list to each of said embedded controllers and receive and process multicast messages received from said embedded controllers.

5. The system of claim 4 wherein said multicast messages comprise handle packets describing a layout and meta data of the parameters being multicast and data packets containing a current parameter value and status for each parameter in the blast list.

6. The system of claim 5 wherein said handle packets are configured to be sent each time a new client is connected to said embedded controller.

7. The system of claim 1 wherein each of said controllers is divided into a communication module capable of handling incoming and outgoing network messages and one or more execution environments to execute function block logic.

8. The system of claim 7 wherein said execution environment comprises the blast hub and the blast list wherein a definition for said blast list is communicated from said system server and wherein upon receiving said blast list said blast hub is capable of multicasting a series of handle packets that describe a layout and meta data of the blast list for all clients and wherein during said multicast said handle packets are received by the system server and each console station.

9. A process of collecting data comprising:
  a. defining a blast list comprising at least one parameter on a system server;
  b. sending the blast list from the system server to each controller in a group of controllers;
  c. collecting data comprising said at least one parameter on each controller;
  d. sending said data from each controller to the system server and to each console station within a group of console stations by a multicast of data; and
  e. then sending said data from said system server to one or more clients outside of said system server, the system server and at least one console station comprising a blast Control Data Access (CDA) server receiving said data meeting, said blast list definition of parameters and a blast service to store said data meeting said blast list definition of parameters to a dynamic cache, said blast list communicated from said blast service to said blast CDA server which scatters said blast list into individual blast lists for each controller, where said data can be made available to displays, fast history subsystem or outside applications and analytics.

10. The process of claim 9 wherein said blast list is first defined, then stored on said system server and made ready to be readily accessed by one or more components inside or outside of a system.

11. The process of claim 9 wherein the blast list comprises all of the parameters that are determined to be of highest importance to collect for analysis.

12. The process of claim 9 wherein each of said controllers contains a blast hub for transmitting data comprising said at least one parameter of a blast list.

13. The process of claim 9 wherein said one or more clients are selected from the group consisting of one or more of display screens, outside computers or servers, applications to analyze said data and a history of said data collected over a defined period of time.

14. The process of claim 9 wherein each of said controllers is divided into a communication module to handle incoming and outgoing network messages and one or more execution environment to execute function block logic.

15. The process of claim 14 wherein said execution environment comprises the blast hub and the blast list wherein a definition for said blast list is communicated from said system server and wherein upon receiving said blast list said blast hub multicasts a series of handle packets that describe a layout and meta data of the blast list for all clients and wherein during said multicast said handle packets are received by the system server and each console station.

16. The process of 15 wherein once the multicast of the series of the handle packets is complete, the blast hub shifts to multicasting values and status of the parameters in the blast list to all clients.

17. The process of 16 wherein each time a new client is connected to said controllers, the handle packets are resent by multicasting to all clients before resuming the multicasting of said values and status of the parameters in the blast list to all clients.

18. The process of claim 9 wherein the parameters in said blast list are selected from one or more recommended parameters contained in programmable elements within at least one of said controllers.

19. The process of claim 9 wherein the parameters in said blast list are identified by a set of parameters to be collected by a fast history subsystem or the parameters in said blast list are additional parameters that are selected on an ad hoc basis.

20. The process of claim 9 wherein packets defining the blast list from the system server and the handle packets from the controllers are cryptographically verified; wherein the data packets containing the values and status of parameters from the blast list use a light-weight hash for tamper detection; wherein the origin of all packets in the system are checked against a known white list of communicating nodes comprising the system server, console stations and embedded controllers.

* * * * *